United States Patent [19]

Albright

[11] 4,219,058
[45] Aug. 26, 1980

[54] APPARATUS FOR CONVERTING A TREE FELLER INTO A FELLER BUNCHER

[76] Inventor: Alva Z. Albright, 6407 Masonic Dr., Alexandria, La. 71301

[21] Appl. No.: 965,352

[22] Filed: Nov. 30, 1978

[51] Int. Cl.³ ............................................. A01G 23/08
[52] U.S. Cl. .............................. 144/3 D; 144/309 AC
[58] Field of Search ................... 144/3 D, 34 R, 34 E, 144/309 AC

[56] References Cited

U.S. PATENT DOCUMENTS 3,823,153  7/1974  Moser .................................. 144/3 D Primary Examiner—W. Donald Bray Attorney, Agent, or Firm—James B. Lake, Jr.

[57] ABSTRACT

In combination, a directional tree feller a mounting pedestal for pivotally mounting the feller on the free end of a prime mover boom, a tree grapple pivotally mounted with the pedestal on the prime mover boom to depend therefrom behind the feller short of the lowest part thereof when in a horizontal tree cutting position, and an hydraulic cylinder mounted on the boom and adapted to pivot the feller upward clear of the grapples for a normal use thereof, and downward and rearward for cutting a tree below horizontal, the back of the feller pushing the grapple out of the way until swung forward and upward to allow grapple to return to normally depending operating position.

2 Claims, 2 Drawing Figures

APPARATUS FOR CONVERTING A TREE FELLER INTO A FELLER BUNCHER

BACKGROUND OF THE INVENTION

The invention relates generally to tree fellers, and more particularly to directional tree fellers and bunchers in which the buncher does not limit the combination relative to tree size.

The nearest prior art in my U.S. Pat. No. 3,874,432 in which a tree felled with a directional pusher is mounted on a bulldozer type prime mover. No buncher is provided or could be provided in this combination as provided in my present improved invention.

Where a tree feller is connected with a boom type prime mover, bunchers are known in the prior art, but invariably they comprise grapples which engage the standing tree and hold it in place while being cut and then after cutting bunches the cut trees individually from standing positions. The size and mass of the tree feller and buncher thus limits the size of the tree to that which can be supported thereby. Prior art in this category comprise: my U.S. Pat. Nos. 4,013,106 and 3,991,799; Doel et al, 3,643,712; R. L. Probst, 3,140,736; Pope, 2,882,941; Horncastle, 3,102,562; Bangert et al, 3,747,651; and Tucek, 3,575,222. In the invention a tree is directionally felled and does not require support after being cut. The grapple is then used to engage the fallen tree for bunching and thus is not limited to the size of tree that the invention can support in an upright cut state.

SUMMARY OF THE INVENTION

It is an object of the invention to provide a combination directional tree feller and buncher that is not limited to the size of trees that can be felled by the mass of the combination.

Another object of the invention is to provide a mounting pedestal having a height for pivotally mounting a tree feller parallel and closer to the ground at the end of a boom than a grapple for use as a buncher.

FIG. 1 is a side elevation of the invention showing operating position of feller in use in full lines, and in two alternate positions in phantom; and FIG. 2 is a front end view of FIG. 1 with feller in an alternate raised position, and buncher in operable position.

DETAILED DESCRIPTION OF THE PREFERRED EMBODIMENT

Figure 1:
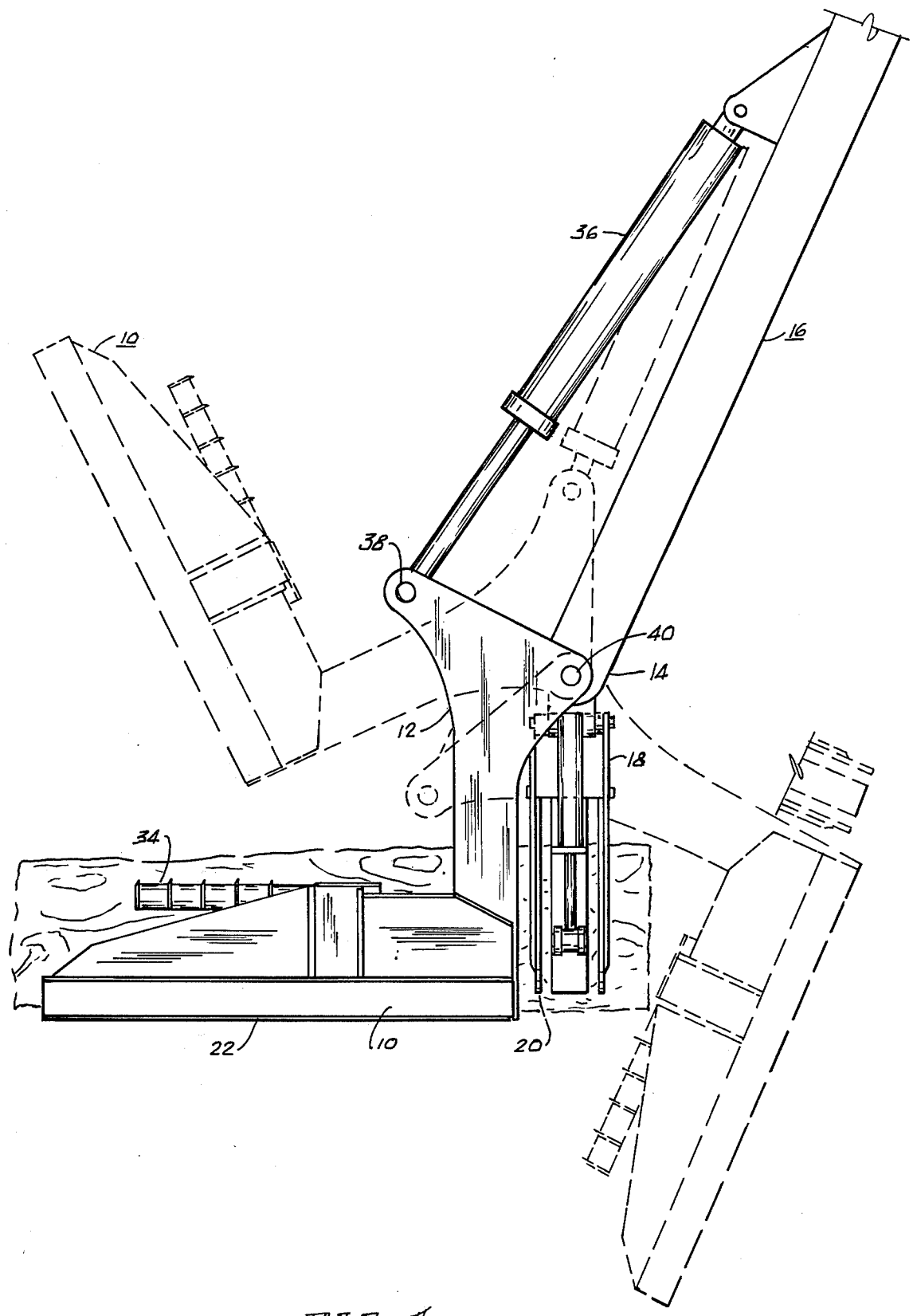
Figure 2:
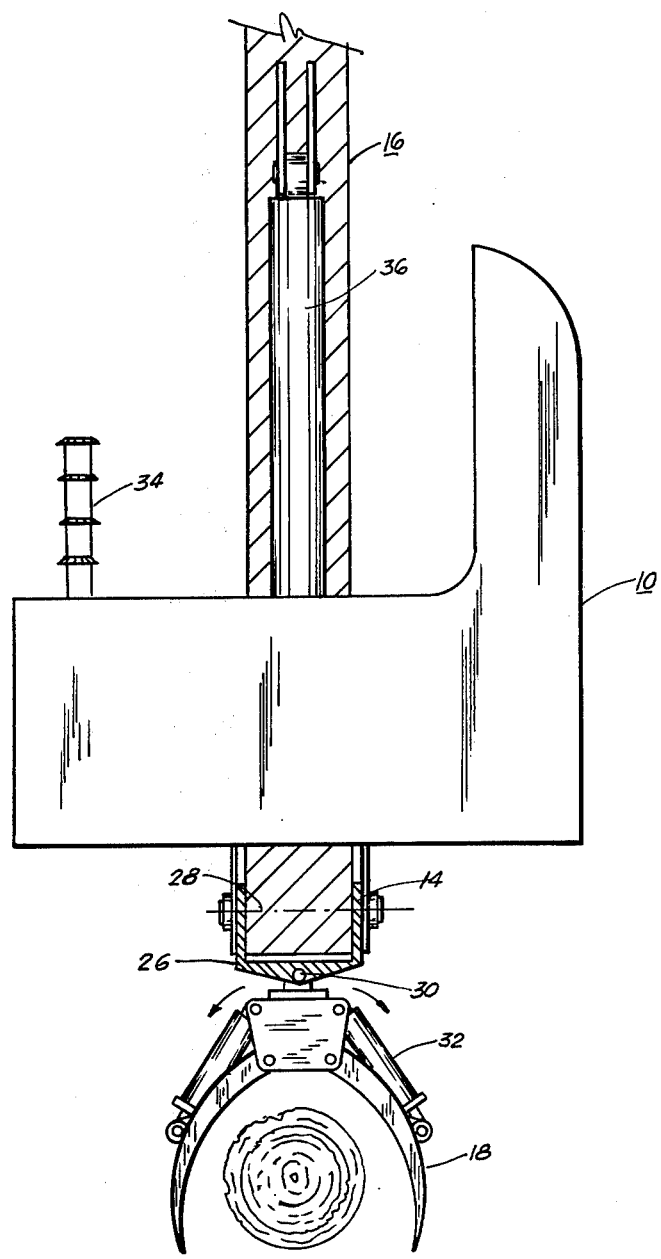

Referring to FIGS. 1 and 2, the invention comprises a directional tree feller 10 such as described in my U.S. Pat. No. 3,874,432, pivotally mounted by a mounting pedestal 12 to the free end 14 of the boom 16 of a boom type prime mover (not shown). A log grapper 18 is also pivoted to the free end 14 of boom 16 with or adjacent to mounting pedestal 12 to depend behind tree feller 10 and with the lowest extremity 20 above the lowest extremity 22 of tree feller 10 in a horizontal position to ensure that grapple 18 does not touch the ground and possibly interfere with the tree feller 10 in cutting position. A universal joint is provided the grapple by pivoting a yoke 26 to the free end 14 of the boom 16 and the grapple to the yoke with the respective pivot axes 28 and 30 normal. As can be seen from a perusal of FIGS. 1 and 2, the pivot axis 30 of the grapple is also normal to the pivot axis of the pedestal. Hydraulic cylinders 32 actuate grapple 18 which always depends normal to the ground regardless of the boom position. A tree pusher 34 is part of tree feller 10 and operates to directionally push the tree in the desired direction as it is felled as described in my U.S. Pat. No. 3,874,432. An hydraulic cylinder 36 is bracketed adjacent the free end 14 of boom 16 and pivoted to an end 38 of mounting pedestal 12 transversely opposite and in front of said pesestal's pivot attachment 40 to the free end 14, the pedestal being approximately triangular shaped.

In operation, the invention bunches only felled trees and does not have to be massive enough to hold a cut tree upright as in prior bunchers. Thus in cutting large trees only the easily ascertainable excess of saw length over tree diameter is determined rather than the relative masses of the feller-buncher and the cut tree.

What is claimed is:

1. In combination with a boom type prime mover, a directional tree feller having a forwardly extending arm; a substantially triangularly shaped mounting pedestal fixed normal to said tree feller by a depending end of said pedestal; said mounting pedestal being pivoted about an axis by a reawardly extending upper end thereof to a free end of a boom of said boom type prime mover; a tree grapple also pivoted to said boom free end said tree grapple being disposed behind said mounting pedestal and being pivoted to said boom on an axis extending normal to said pivot axis of said pedestal and an hydraulic cylinder pivoted between said boom and a forwardly extending upper end of said mounting pedestal and adaped to pivot said mounting pedestal and tree feller fixed thereto forwardly clear of said grapple, and rearwardly for engaging and lifting said grapple.

2. in combination as described in claim 1 wherein said rearwardly extending upper end of said grapple is pivoted to a yoke which is pivoted to said boom free end, the last mentioned respective pivot axes being normal for said grapple to depend vertically from said boom free end at all times when not engaged by said tree feller.

* * * * *